(12) United States Patent
Schwiebert et al.

(10) Patent No.: US 7,204,712 B2
(45) Date of Patent: Apr. 17, 2007

(54) MONOLITHIC LIVING HINGE SMALL FORM FACTOR TRANSCEIVER BAIL-DELATCH

(75) Inventors: Matthew K. Schwiebert, Cupertino, CA (US); R. Sean Murphy, Sunnyvale, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/129,138

(22) Filed: May 13, 2005

(65) Prior Publication Data

US 2006/0258201 A1    Nov. 16, 2006

(51) Int. Cl.
*H01R 13/627* (2006.01)
*H01R 13/00* (2006.01)

(52) U.S. Cl. .................. 439/352; 439/484
(58) Field of Classification Search ........... 439/484, 439/352
See application file for complete search history.

(56) References Cited

U.S. PATENT DOCUMENTS

| | | | |
|---|---|---|---|
| 6,430,053 B1 | 8/2002 | Peterson et al. | |
| 6,439,918 B1 | 8/2002 | Togami et al. | |
| 6,494,623 B1 | 12/2002 | Ahrens et al. | |
| 6,533,603 B1 | 3/2003 | Togami | |
| 6,556,445 B2 | 4/2003 | Medina | |
| 6,570,768 B2 | 5/2003 | Medina | |
| 6,666,484 B1 * | 12/2003 | Branch et al. | 292/128 |
| 6,746,158 B2 | 6/2004 | Merrick | |
| 6,851,867 B2 | 2/2005 | Pang et al. | |

OTHER PUBLICATIONS

Paul A. Tres, "Living Hinges," Designing Plastic Parts for Assembly, 5th Edition (2003), Hanser Publishers, Munich, 2 pages.

* cited by examiner

*Primary Examiner*—Briggitte R. Hammond

(57) ABSTRACT

A monolithic bail-delatch mechanism is provided for a module plugged into a cage. The bail-delatch mechanism is a single monolithic unit that includes a living hinge connecting a bail and a delatch clip. The living hinge, the bail, and the delatch clip may be made of a single injection molded plastic part. The bail may include cantilever hooks for securing the bail against the module in a latched position. The delatch clip may include a spring mechanism having two spring arms for locking the bail-delatch mechanism to the module, and a delatch fork having tines with wedges for releasing a post of the module from a latch tab of the cage.

6 Claims, 4 Drawing Sheets

MONOLITHIC LIVING HINGE SMALL FORM FACTOR TRANSCEIVER BAIL-DELATCH

DESCRIPTION OF RELATED ART

Small form factor pluggable (SFP) fiber optic and copper transceivers often include a bail-delatch mechanism that eases the process of unplugging the transceiver. Conventional bail-delatch mechanisms include metal wire bails and multi-piece injection molded plastic bail-delatch systems.

SUMMARY

In one embodiment of the invention, a monolithic bail-delatch mechanism is provided for a module plugged into a cage. The bail-delatch mechanism is a single monolithic unit that includes a living hinge connecting a bail and a delatch clip. The living hinge, the bail, and the delatch clip may be made of a single injection molded plastic part. The bail may include cantilever hooks for securing the bail against the module in a latched position. The delatch clip may include a spring mechanism having two spring arms for locking the bail-delatch mechanism to the module, and a delatch fork having tines with wedges for releasing a post of the module from a latch tab of the cage.

BRIEF DESCRIPTION OF THE DRAWINGS

Use of the same reference numbers in different figures indicates similar or identical elements.

DETAILED DESCRIPTION

Figure 1:
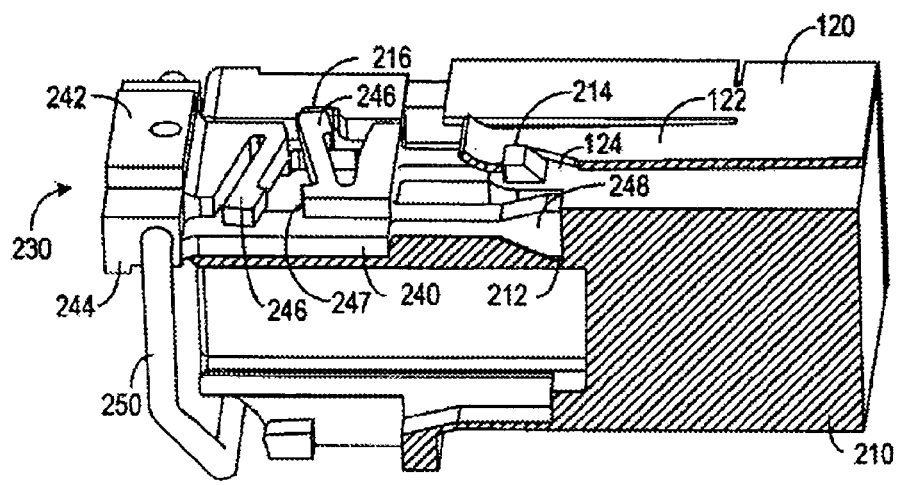
FIGS. 1 and 2 illustrate an exemplary bail-delatch mechanism.

FIG. 1 is a cut-away, perspective view of an exemplary system including a pluggable module 210, a cage 120, and a bail-delatch mechanism 230 in a latched configuration. In FIG. 1, half of cage 120 is cut away to better show module 210 and bail-delatch mechanism 230, and part of module 210 is also cut away to better illustrate bail-delatch mechanism 230. Standard features associated with optical fibers and transceivers in module 210 are simplified in the drawings to improve the clarity of the drawings.

Cage 120 can be a standard cage and generally complies with an MSA (Multisource Agreement) agreement such as SFF (Small Form Factor) committee's INF-8074i "SFP Transceiver" document. In particular, cage 120 includes a latch tab 122 (half of which is shown in FIG. 1) including a hole 124 that can accommodate a post 214 positioned according to the requirements of the pertinent MSA. Although FIG. 1 illustrates cage 120 as being isolated, cage 120 would typically be one of several substantially identical cages arranged in a dense array of cages. Such cages are well known in the art and are available commercially from suppliers such as Amp/Tyco International, Picolight Inc., or Molex Inc. Other known and suitable cage structures for module 210 can accommodate a row of (e.g., four) immediately adjacent modules.

Module 210 has dimensions in compliance with the pertinent MSA and further includes notches 216 and pockets 212 that accommodate portions of bail-delatch mechanism 230. In one example, module 210 is made of a metal such as zinc ZA8, which can be cast to create fine features necessary for bail-delatch mechanism 230 and for fiber optic and electrical components (not shown) contained in module 210. Alternatively, module 210 can be injection molded using a high temperature thermal plastic material such as one of the materials from the ULTEM family of plastics from General Electric, Co.

Figure 2:
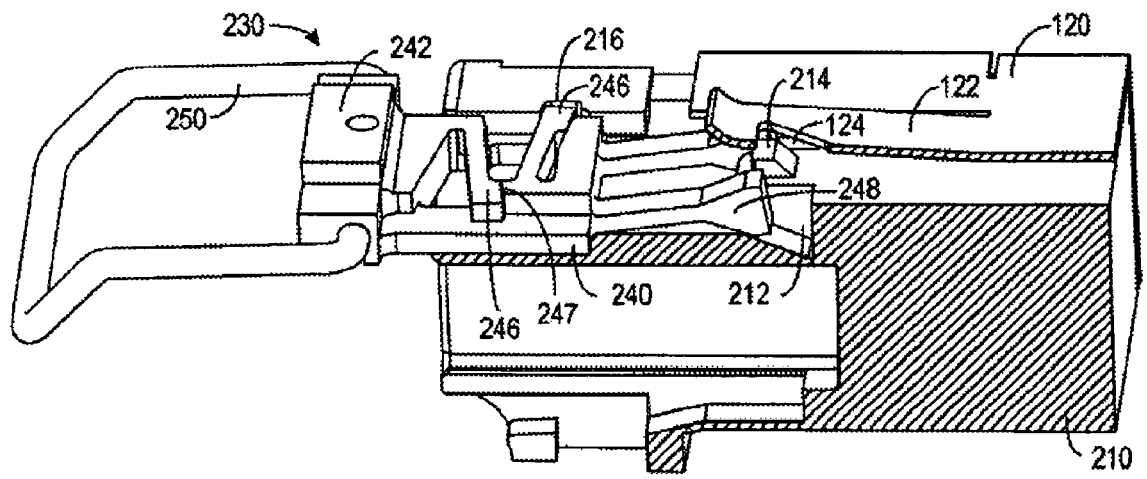

As shown in FIG. 1, bail-delatch mechanism 230 includes an integrated structure 240 (hereafter "delatch clip 240") and a bail 250. Delatch clip 240 can be molded or machined and includes features such as ridges 242 and 244, spring arms 246, and wedges 248. Bail 250 is friction fit through a hole in delatch clip 240 and can be flipped down as shown in FIG. 1 to keep bail 250 out of the way, or flipped up as shown in FIG. 2 to extend out and facilitate pulling on bail-delatch mechanism 230 during removal of module 210. Ridges 242 and 244 also provide grip points for pulling bail-delatch mechanism 230 when bail 250 is down or is otherwise inconvenient for gripping. An LC (Lucent connector) fiber connector (not shown) can attach to module 210 through the center of bail 250.

Spring arms 246 have ends in notches 216 in module 210 (only one is visible in FIGS. 1 and 2). Spring arms 246 flex in response to a pulling force on bail-delatch mechanism 230 and permit a limited range of motion for bail-delatch mechanism 230 relative to module 210.

In the latched configuration, spring arms 246 can be uncompressed or have some spring loading, and wedges 248 reside in pockets 212 in module 210. Above wedges 248 is latch tab 122. Through latch tab 122 is hole 124, in which post 214 resides when module 210 is latched in cage 120.

To remove module 210 from cage 120, an operator pulls out on bail-delatch mechanism 230 via bail 250 or ridges 242 and/or 244. Initial pulling bends/flexes spring arms 246 and slides wedges 248 out of their respective pockets 212. As wedges 248 rise out of pockets 212, wedges 248 push up on latch tab 122.

FIG. 2 shows a configuration where spring arms 246 have reached a limit of their compression and wedges 248 have lifted latch tab 122 above post 214. In the example of FIGS. 1 and 2, spring arms 246 are at angles such that pulling on delatch clip 240 flexes spring arms 246 about their respective bases and extends the ends of spring arms 246 further into notches 216 in module 210. Accordingly, pulling more firmly engages spring arms 246 in notches 216. In the illustrated configuration of FIG. 2, spring arms 246 contact fixed portions 247 (only one is labeled) of bail-delatch mechanism 230 and cannot flex further. The pulling force thus acts on module 210 to slide module 210 out of cage 120.

Figure 3:
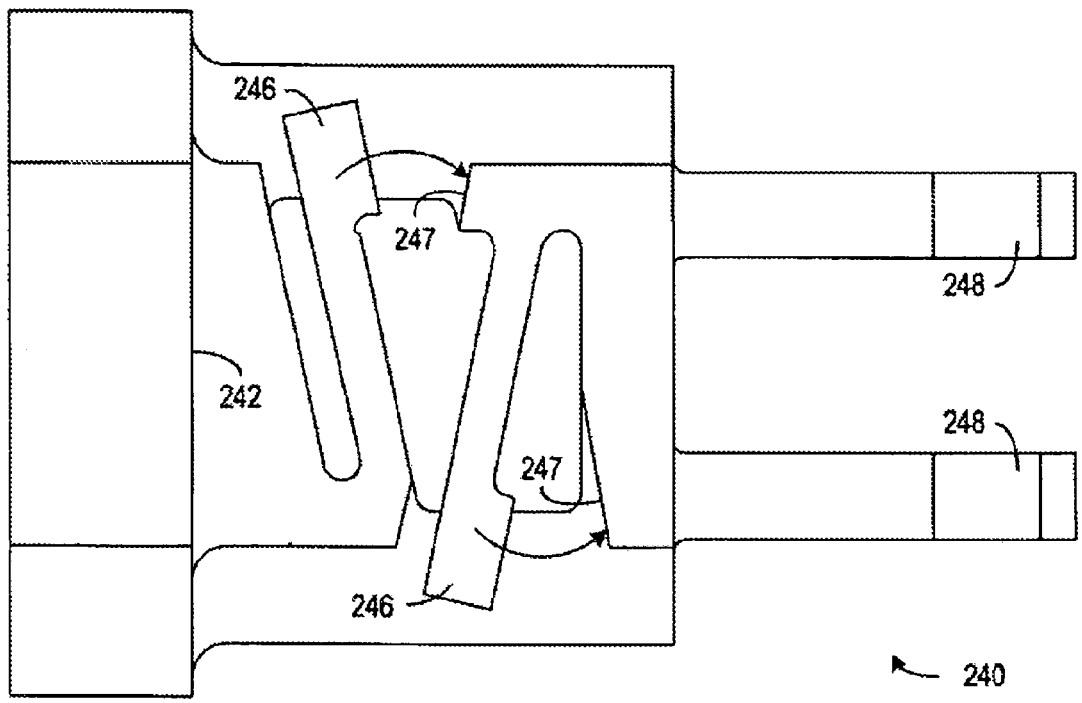
FIGS. 3 and 4 illustrate an exemplary delatch clip.
Figure 4:
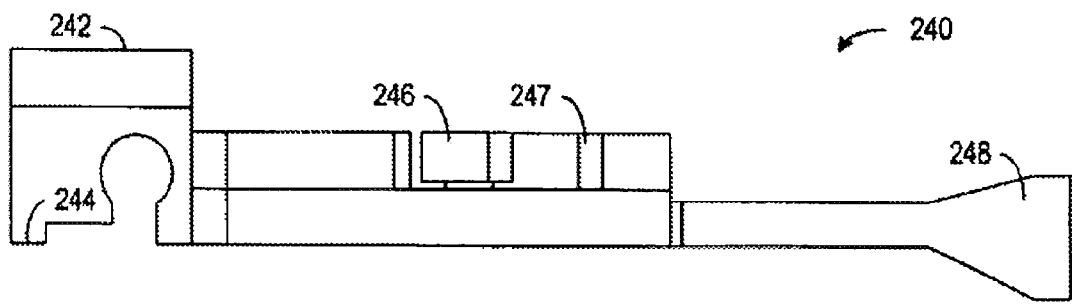

FIGS. 3 and 4 respectively show top and side view of delatch clip 240 when uncompressed. As noted above, when an operator pulls on delatch clip 240, spring arms 246, which are in notches in module 210, flex until encountering surfaces 247, which prevent further flexing of spring arms 246 and thereby transfer the pulling force to module 210. As illustrated, spring arms 246 are crossed at matching angles to provide a balanced force on module 210.

In one example, delatch clip 240 is made of a polymer material that can be molded with the required features and can withstand the temperature range specified for module 210. One suitable material is Zytel FR15 NC010 from Dupont, but many other materials can be used. In one example, the material of delatch clip 240 should have a flexural modulus in a range between about 3000 to 5000 MPa, have a minimum tensile strength of 60 MPa, be able to withstand at least a 8.5% elongation, have a heat deflection temperature of at least 70.degree. C., and have a UL-V0 rated flammability.

Figure 5:
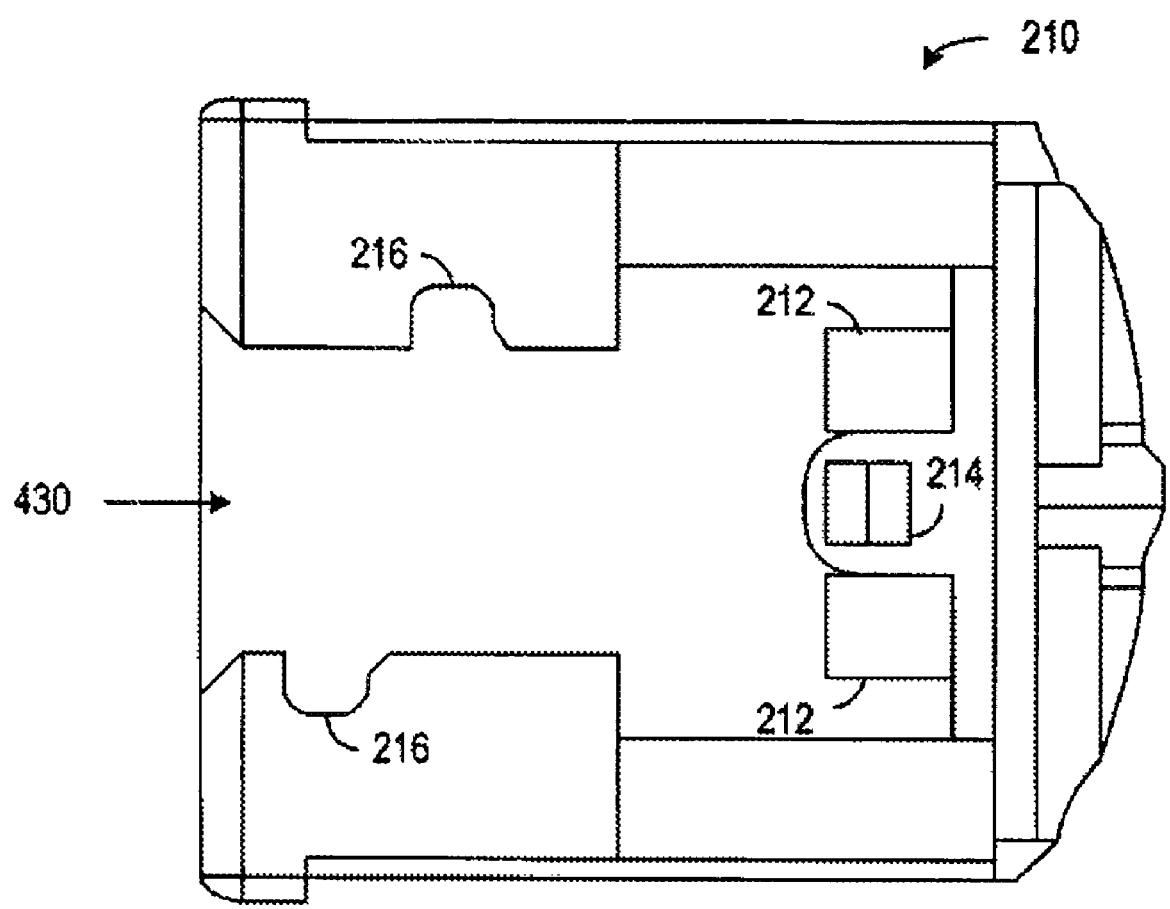
FIG. 5 illustrates an exemplary module for receiving the exemplary bail-delatch mechanism of FIGS. 1 and 2.

FIG. 5 is a top view of a portion of module 210 associated with bail-delatch mechanism 230. As illustrated, module 210 includes a channel 430 having guide rails along both sides to guide the movement of delatch clip 240. The dimensions of channel 430 and the associated guide rails can be the same as the dimensions of the matching structures in conventional modules so that module 210 can be used with either a pull-to-detach mechanism in accordance with the current invention or a standard push-to-detach mechanism. However, along channel 430, module 210 includes notches 216 that are offset from each other to accommodate spring arms 246 of delatch clip 240 (FIG. 3).

When assembling module 210 of FIG. 5 and delatch clip 240 of FIG. 3 to form the assembly of FIG. 1, spring arms 246 can be lifted above the top of module 210 while sliding delatch clip 240 into channel 430. Spring arms 246 drop down into notches 216 when delatch clip 240 reaches the latched position.

Module 210 also includes pockets 212 in which respective wedges 248 reside when in the latched position. In one example, pockets 212 include an incline at an angle (e.g., 24 degree) that is less than or equal to a bottom angle (e.g., 30 degree) of wedges 248 so that wedges 248 slide along their heels during the delatch operation that lifts latch tab 122.

As noted in the description of FIG. 1, bail-delatch mechanism 230 has a handle including bail 250 and ridges 242 and 244 that permit an operator to pull on the bail-delatch mechanism 230 and remove module 210. Bail 250 has a friction fit with delatch clip 240 50 that bail 250 remains in any position (e.g., up or down) that the operator prefers. Bail-delatch mechanism 230 could alternatively employ a variety of other types of handles. For example, ridges 242 and 244 could be omitted in a system that relies solely on bail 250 when removing module 210.

Figure 6:
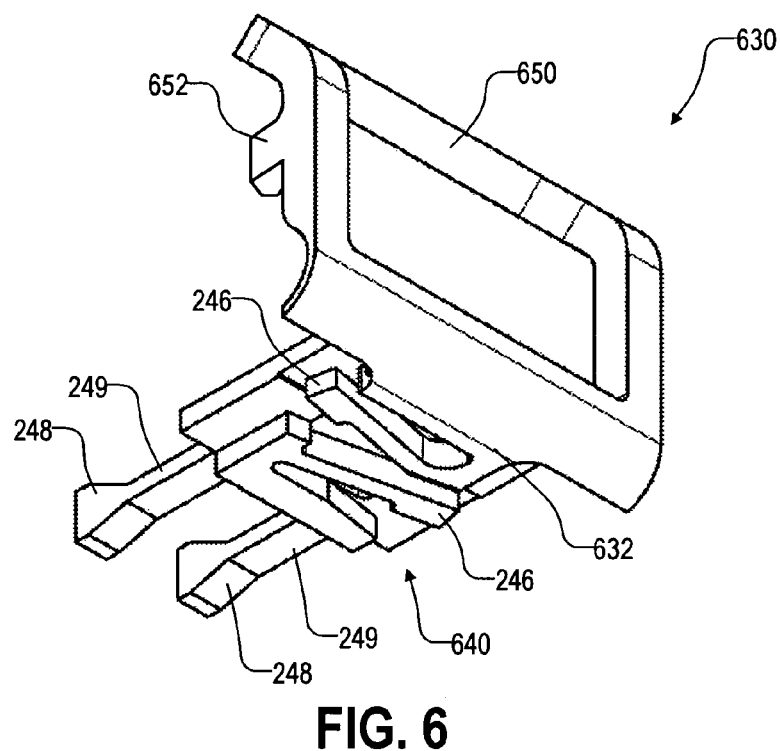
FIG. 6 illustrates a bail-delatch mechanism in one embodiment of the invention.

FIG. 6 illustrates a monolithic bail-delatch mechanism 630 that can be used to release module 210 from cage 120 in one embodiment of the invention. In one embodiment, bail-delatch mechanism 630 is formed by plastic injection molding using a material such as nylon or polypropylene.

Bail-delatch mechanism 630 includes a living hinge 632 between a delatch clip 640 and a bail 650. Living hinge 632 is a thin section of plastic that allows bail 650 to pivot between a latched position and an unlatched position.

Delatch clip 640 is similar to delatch clip 240 (FIGS. 3 and 4). In one embodiment, delatch clip 640 includes a spring mechanism having spring arms 246, and a delatch fork having tines 249 with wedges 248.

Figure 7:
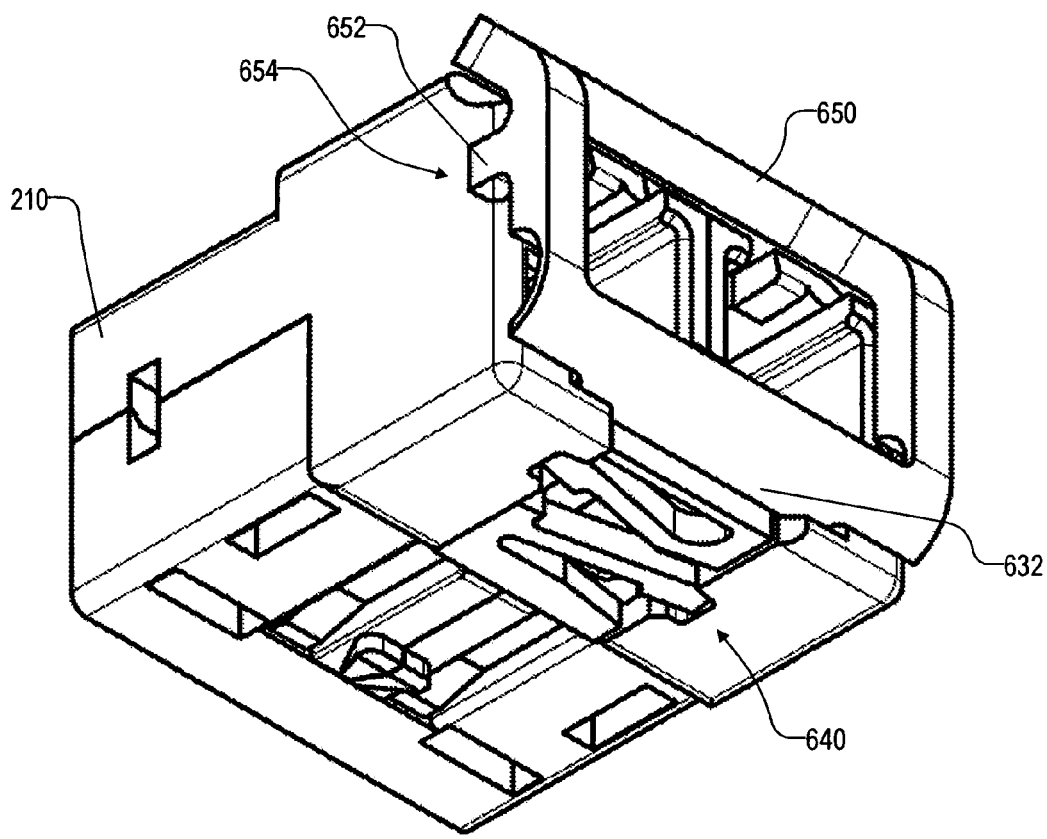
FIG. 7 illustrates the bail-delatch mechanism of FIG. 6 inserted into a module in one embodiment of the invention.

Bail 650 is similar to bail 250 (FIGS. 1 and 2). In one embodiment, bail 650 includes cantilever hooks 652 for maintaining bail 650 in the latched position. Referring to FIG. 7, bail 650 is pivoted upward at living hinge 632 in the latched position. Cantilever hooks 652 then engage notches 654 (only one is visible) in module 210 to secure bail 650 in the latched position. Alternatively, bail-delatch mechanism 630 can be formed with bail 650 in the latched position (e.g., perpendicular to delatch clip 640) so that bail 650 would naturally rest against module 210.

Bail-delatch mechanism 630 offers many advantages over conventional bail-delatch systems with metal wire bails and multi-piece injection molded plastic bail-delatch systems. With a monolithic construction, bail-delatch mechanism 630 lowers cost by minimizing part-count and eliminating assembly. With an all-plastic construction, bail-delatch mechanism 630 also eliminates the issue of transmission of electrostatic discharge (ESD) energy into the module when the exposed metal bail is struck directly by contact ESD.

Various other adaptations and combinations of features of the embodiments disclosed are within the scope of the invention. Numerous embodiments are encompassed by the following claims.

What is claimed is:

1. A monolithic bail-delatch mechanism for a module plugged in a cage, comprising:
   a bail;
   a delatch clip, comprising:
      a spring mechanism comprising two spring arms for locking the delatch clip to the module, the spring arms engaging notches in the module and allowing the delatch clip to have a small travel before locking the delatch clip to the module; and
      a delatch fork comprising tines with wedges for releasing a post of the module from a latch tab of the cage, the wedges fitting in angled pockets in the module so that the wedges would rise and push against the latch tab to release the post when the delatch clip is pulled away from the cage;
   a living hinge connecting the bail and the delatch clip;
   wherein the bail, the delatch clip, and the living hinge comprise a single monolithic part.

2. A monolithic bail-delatch mechanism for a module plugged in a cage, comprising:
   a bail;
   a delatch clip, comprising:
      a clip that locks the delatch clip to the module; and
      a wedge that pushes up against a latch tab of the cage to release a post of the module from the latch tab when the delatch clip is pulled away from the cage;
   a living hinge connecting the bail and the delatch clip;
   wherein the bail, the delatch clip, and the living hinge comprise a single monolithic part.

3. The mechanism of claim 2, wherein the bail comprises cantilever hooks for securing the bail in a latched position, the cantilever hooks engaging notches in the module.

4. The mechanism of claim 2, wherein the bail, the delatch clip, and the living hinge comprise a single injection molded plastic part.

5. The mechanism of claim 4, wherein the living hinge is a thin section of plastic between the bail and the delatch clip.

6. The mechanism of claim 4, wherein the bail is formed perpendicular to the delatch clip in a latched position.

* * * * *